United States Patent [19]

Sato

[11] Patent Number: 5,153,740
[45] Date of Patent: Oct. 6, 1992

[54] RECORDING AND DEMODULATION DEVICES FOR ELECTRONIC STILL CAMERA

[75] Inventor: Kouichi Sato, Tokyo, Japan

[73] Assignee: Asahi Kogaku Kogyo K.K., Tokyo, Japan

[21] Appl. No.: 825,803

[22] Filed: Jan. 21, 1992

Related U.S. Application Data

[63] Continuation of Ser. No. 632,646, Dec. 26, 1990, abandoned, which is a continuation of Ser. No. 474,308, Feb. 5, 1990, abandoned, which is a continuation of Ser. No. 306,972, Feb. 6, 1989, abandoned.

[30] Foreign Application Priority Data

Feb. 13, 1988 [JP] Japan ................................. 63-31288
Feb. 19, 1988 [JP] Japan ................................. 63-36728

[51] Int. Cl.$^5$ .............................................. H04N 9/79
[52] U.S. Cl. .................................... 358/310; 358/330; 358/909
[58] Field of Search ............... 358/310, 323, 142, 146, 358/330, 23, 24, 21 V, 906, 909; 360/19.1

[56] References Cited

U.S. PATENT DOCUMENTS

| | | | |
|---|---|---|---|
| 4,152,721 | 5/1979 | Kim | 358/21 |
| 4,271,427 | 6/1981 | Van Den Driessche | 358/23 |
| 4,412,181 | 10/1983 | Marguinaud et al. | 358/23 |
| 4,468,708 | 8/1984 | Coleman, Jr. | 358/310 |
| 4,660,071 | 4/1987 | Kuribayashi | 358/23 |
| 4,800,448 | 1/1989 | Kaneko et al. | 360/35.1 |

*Primary Examiner*—Robert L. Richardson
*Attorney, Agent, or Firm*—Sughrue, Mion, Zinn, Macpeak & Seas

[57] ABSTRACT

A device for use in an apparatus for demodulating the signal reproduced from a recording medium in a still video camera or the like in which the phase of the demodulated signal is always accurately detected. Horizontal periods in which the respective line-sequential color difference signals B-Y and R-Y are present are discriminated, and a timer is operated during periods when the B-Y signal is present. Data is read from the reproduced modulated signal at predetermined points within a half cycle of the waveform of the signal as designated by outputs of the timer.

16 Claims, 8 Drawing Sheets

RECORDING AND DEMODULATION DEVICES FOR ELECTRONIC STILL CAMERA

This is a Continuation of prior Application No. 07/636,646 filed on Dec. 26, 1990, and now abandoned, which is a continuation of grandparent Application No. 07/474,308 filed Feb. 5, 1990, now abandoned, which is a continuation of parent Application No. 07/306,972 filed Feb. 6, 1989, now abandoned.

BACKGROUND OF THE INVENTION

The present invention relates to recording and demodulation devices for an electronic still camera or the like in which a data signal is recorded on a magnetic medium in the DPSK mode and for reproduction is directly A/D converted so as to determine the phase of the signal.

On a magnetic medium used for an electronic still camera there are recorded in a single track in frequency-multiplexed form a luminance signal Y, color difference signals B-Y and R-Y and a data signal ID.

The data signal ID contains information as to whether the recorded image is a frame image or a field image, the track number of the recorded image, the date of recording, and the like. The recording format for the ID signal is shown in FIG. 10.

As shown in FIG. 10, 108 H (H indicating one horizontal period of an image signal) allocated to the user area may be recorded with one bit recorded in either 2 H or 4 H. For all remaining portions of the signal though, one bit is recorded in 4 H.

The data signal ID is DPSK modulated in accordance with its individual "0" and "1" bits. The color difference signals R-Y and B-Y are line sequenced every H to be frequency modulated. The luminance signal is also frequency modulated. Each of these signals is recorded using frequency multiplexing. However, the modulated data signal $f_{ID}$ and the modulated color difference signal $f_{R-Y}$ have adjacent frequencies, and they may instantaneously overlap.

Additionally, the data signal ID is extracted from the reproduced multiplexed signal obtained at the output of the magnetic head with the use of a filter having constants corresponding to the DPSK modulation frequency.

However, when the multiplexed signal is reproduced, there occurs a disruption in the continuity of the phase of the separated data signal $f_{ID}$ at times of data bit transitions from "0" to "1" or vice versa due to the operation of the filter. Further, since the frequency band of the modulated data signal $f_{ID}$ overlaps a portion of that of the modulated color difference signal $f_{R-Y}$, when the modulated data signal $f_{ID}$ is directly demodulated by A/D conversion, there occurs a problem in that precise demodulation of the data signal ID is difficult.

As can be further seen from FIG. 10, the data signal ID is recorded with one bit per 4 H or 2 H starting with the 29th H as counted from the first H after the rise of the vertical synchronizing signal V-SYNC for even-numbered fields, and at the same point but delayed by 0.5 H from the above case for odd-numbered fields.

As a result, the point at which the phase of the modulated data signal $f_{ID}$ changes will always fall at the head of odd-numbered Hs, but not at the head of even-numbered Hs.

SUMMARY OF THE INVENTION

Accordingly, it is an object of the invention to provide a demodulation device which is capable of accurately demodulating the data signal so as to obtain exact output data by carrying out demodulation of the modulated signal $f_{ID}$ at an appropriate time.

In accordance with the above and other objects, the invention provides a demodulation device for reproducing each of a modulated data signal $f_{ID}$ obtained by modulating a data signal ID in the DPSK mode and modulated color difference signals $f_{B-Y}$ and $f_{R-Y}$ obtained by frequency modulating line-sequential color difference signals B-Y and R-Y, respectively, that are recorded in multiplex form on the same track, which demodulation device includes line discriminating means for discriminating horizontal periods in which each of the line-sequential color difference signals B-Y and R-Y are reproduced, a timer which is operated during the period of the color difference signal B-Y as indicated by the line discriminating means, and reading means for retrieving the data of the reproduced modulated data signal $f_{ID}$.

Furthermore, in accordance with another aspect of the present invention, in a still video recorder or the like in which the color difference signals B-Y and R-Y are recorded alternately by switching means which switches every 1 H to thereby produce a line-sequential signal, and the line sequential signal is recorded in multiplex form together with the data signal ID on the same data track on the recording medium, there is provided control means which produces a reset pulse Pr for a period of 0.5 to 1 H by triggering from the vertical synchronizing signal V-SYNC, and driving means for driving the switching means at each pulse of the horizontal synchronizing signal H-SYNC and is reset by the pulse Pr, and which control the switching means so as to obtain a color difference signal B-Y in the horizontal period that follows the first horizontal synchronizing signal H-SYNC following reset.

DESCRIPTION OF THE PREFERRED EMBODIMENTS

Referring to the attached drawings, preferred embodiments of the present invention will now be described.

Figure 1:
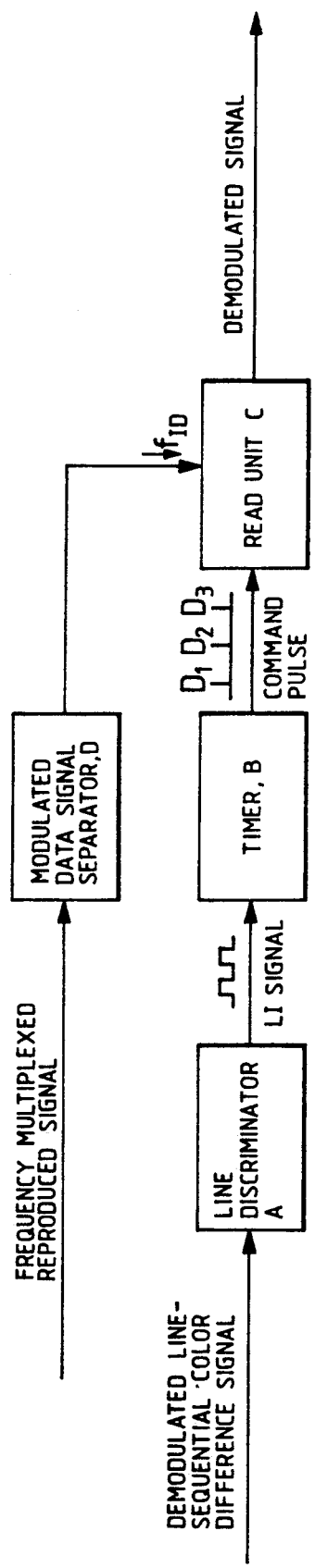
FIG. 1 is a general block diagram showing the basic construction of a demodulating device for data signal for a still video recorder and which is constructed in accordance with the invention.

FIG. 1 is a block diagram showing the basic construction of a data signal demodulation device of the present invention.

A line-sequential color difference signal to be demodulated is applied to a line discriminator A to obtain therefrom a line index signal LI which indicates to which of the color difference signals B-Y and R-Y the current H period corresponds. The LI signal is applied to a timer B to cause it to operate during the period of the color difference signal B-Y. From the timer B are obtained command pulses at predetermined time points $D_1$, $D_2$ and $D_3$ within the 1 H period of the signal.

The reproduced signal from the magnetic head is applied to a modulated data signal separator D, at the output of which is produced a modulated data signal $f_{ID}$, which is input to the reading unit C. Consequently, the modulated data signal $f_{ID}$ is read at the points $D_1$, $D_2$ and $D_3$ by the reading unit. The phase of the modulated data signal $f_{ID}$ in the present H period is detected from the contents of this data, and the signal is thereby demodulated.

Figure 2:
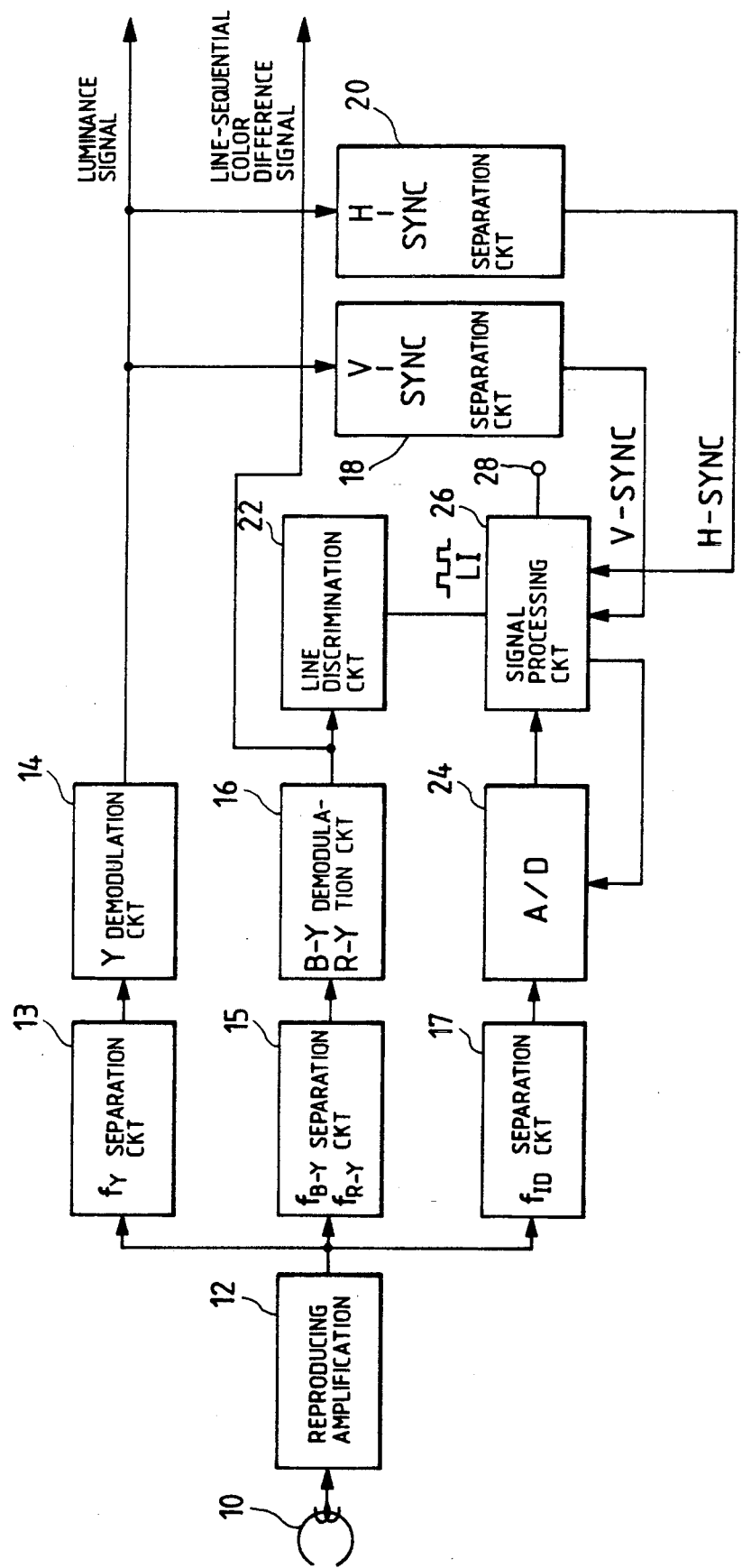
FIG. 2 is a more detailed block diagram of a preferred embodiment of a demodulating device of the present invention.

In FIG. 2 is shown a detailed block diagram of a demodulation device constructed in accordance with the teachings of the present invention.

In FIG. 2, reference numeral 10 indicates a magnetic head which reproduces the signal recorded on the magnetic medium (not shown). Reference numeral 12 designates a reproduction amplifier, 13, a modulated luminance signal separating circuit, 14, a luminance signal demodulating circuit, 15, a modulated color difference signal separating circuit, and 16, a color difference demodulating circuit. Further, reference numeral 17 indicates a modulated data signal separating circuit which is implemented with a filter. Reference numeral 18 identifies a separation circuit for a vertical synchronizing signal V-SYNC, and 20, a separation circuit for a horizontal synchronizing signal H-SYNC.

Further, reference numeral 22 indicates a line discriminator, the output of which is an LI signal which is at a high level when the color difference signal B-Y is present and a low level when the color difference signal R-Y is present. Reference numeral 24 is an A/D converter to the input terminal of which is applied a modulated data signal $f_{ID}$ from the modulated data signal separating circuit 17.

Still further, reference numeral 26 designates a signal processor constituted by a computer to which is supplied the output digital signal from the A/D converter 25, in addition to the horizontal synchronizing signal H-SYNC, the vertical synchronizing signal V-SYNC, and the LI signal. A command pulse signal is supplied to the A/D converter 24 from the signal processor 26.

The operation of this circuit will now be described.

First, the operation in the 4 H mode for the data signal will be described with reference to the flowchart of FIG. 3, the timing chart of FIG. 4, and the waveform diagram of FIG. 5.

Figure 4:
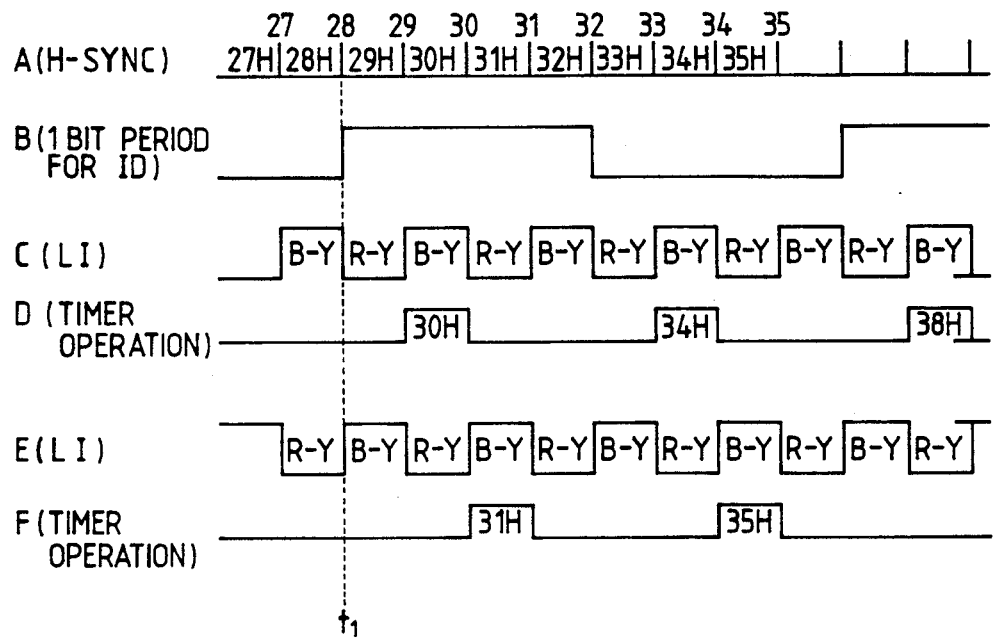
FIGS. 4A–4F are timing charts of and FIGS. 5A and B are waveform diagram of the modulated data signal $f_{ID}$.

In FIG. 4, the horizontal synchronizing signal H-SYNC is shown at A, a one-bit period of the data signal is shown at B, LI signals are depicted at C and E, and D and F indicate the periods during which the timer is activated (turned on). FIG. 5 shows portions of the modulated data signal $f_{ID}$. There are 13 cycles of this signal contained within 1 H. The phase of the signal $f_{ID}$ of course changes corresponding to the data bits contained within the signal.

Figure 3:
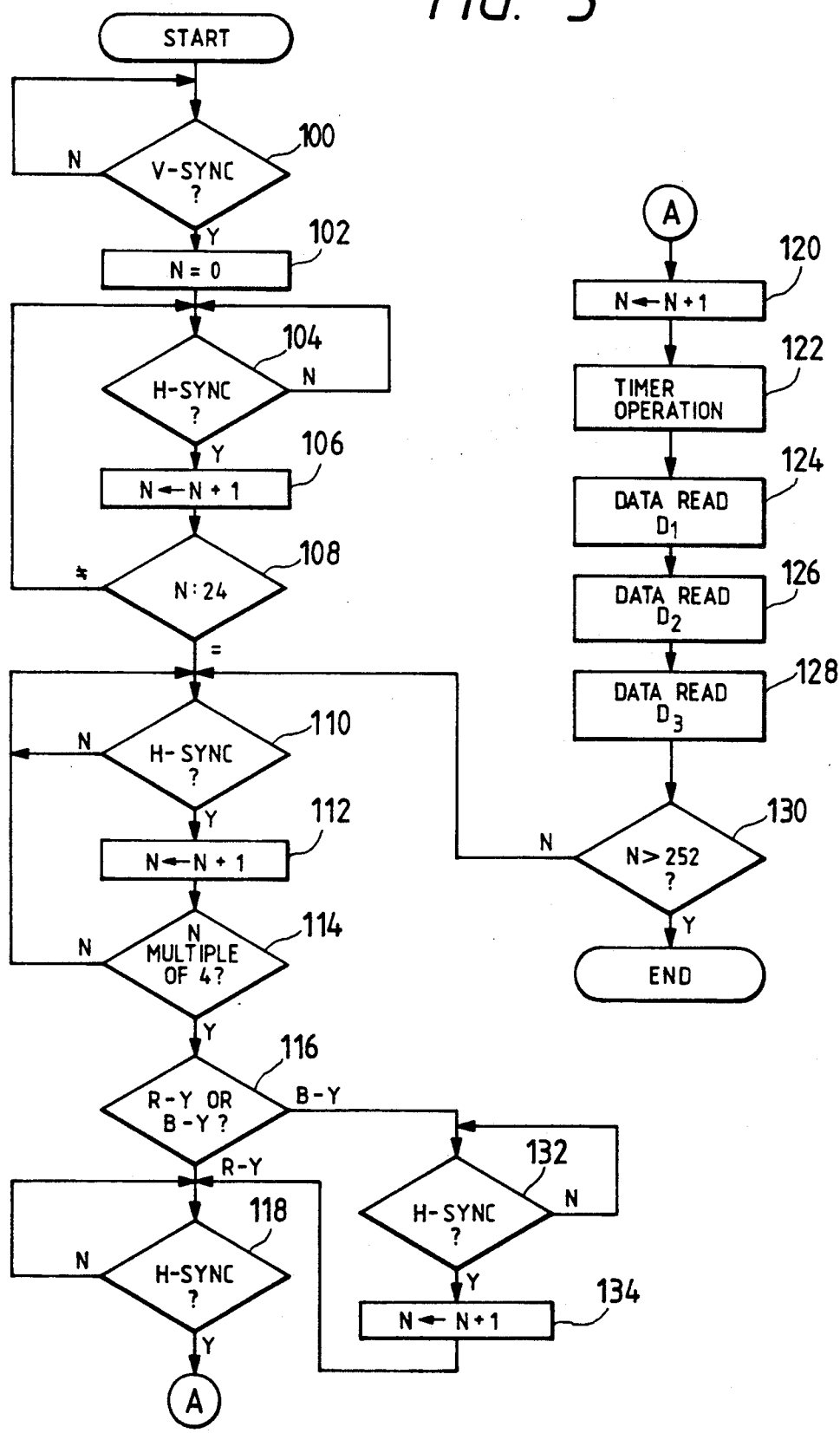
FIG. 3 is a flowchart used for explaining the operation of the inventive demodulating device in the 4 H mode.

With reference to FIG. 3, after waiting in step 100, when a vertical synchronizing signal V-SYNC is detected by the signal processor 26, in step 100 the counter, which has a maximum count value N corresponding to the number of pulses of the horizontal synchronizing signal, is reset to zero. When the rise of the horizontal synchronizing signal H-SYNC is detected in step 104, the count value is incremented by 1 in step 106. The pulses of the horizontal synchronizing signal are then counted by looping through steps 104, 106 and 108 until the value of N reaches 24.

Figure 10:
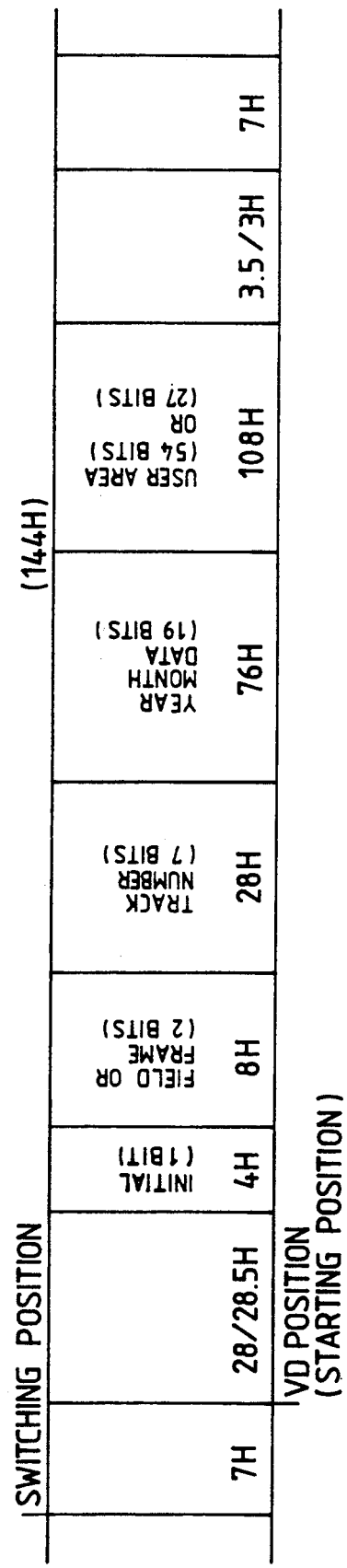
FIG. 10 is a diagram showing the recording format of the data signal ID.

When the counter reaches 24, the processor 26 waits in step 110 for a rise in the horizontal synchronizing signal H-SYNC. When a rise in this signal is detected, the count value is incremented by 1 in step 112. This counting continues until the count value N reaches a multiple of 4 in step 114. This occurs for N=28 at time point $t_1$ indicated in FIG. 4, that is, at the leading part of the initial bit of the recording format shown in FIG. 10. In the next horizontal synchronizing period (29th H), it is judged which one of the color difference signals R-Y and B-Y is being reproduced.

When the color difference signal R-Y is detected in step 116 as shown in FIG. 4, in step 118 the rise of the next pulse of the horizontal synchronizing signal H-SYNC is awaited. When the next pulse is detected, the counter is incremented in step 120. At this time, N=29. The signal processor 26 triggers the timer in the 29th horizontal synchronizing signal period in step 122, and the timer is activated to perform its counting operation in the next H period (30th H—see FIG. 4 at D).

At a predetermined time $D_1$ (see FIG. 5) counted by the timer, in step 124 a read start command is applied from the signal processor 26 to the A/D converter 24. The voltage value of the modulated data signal $f_{ID}$ at the point of time D is converted to a digital value and is read into the processor 26. When this operation is finished, the processor 26 issues a completion command to the A/D converter, thus completing the reading operation. In the same manner, similar data is read at time points $D_2$ and $D_3$ in steps 126 and 128, respectively.

If the count N is less than 252, the process returns to step 110 and continues in the above-described manner as long as N is less than 252.

In this manner, the timer is triggered at the (24+4n+1)-th pulses of the horizontal synchronizing signal H-SYNC as counted from the last pulse of the vertical synchronizing signal V-SYNC so that the timer is operated every (24+4N+3)-th H. In this manner, reading of the modulated data signal $f_{ID}$ in the B-Y period immediately after the time point at which the data signal ID changes is avoided.

Figure 5:
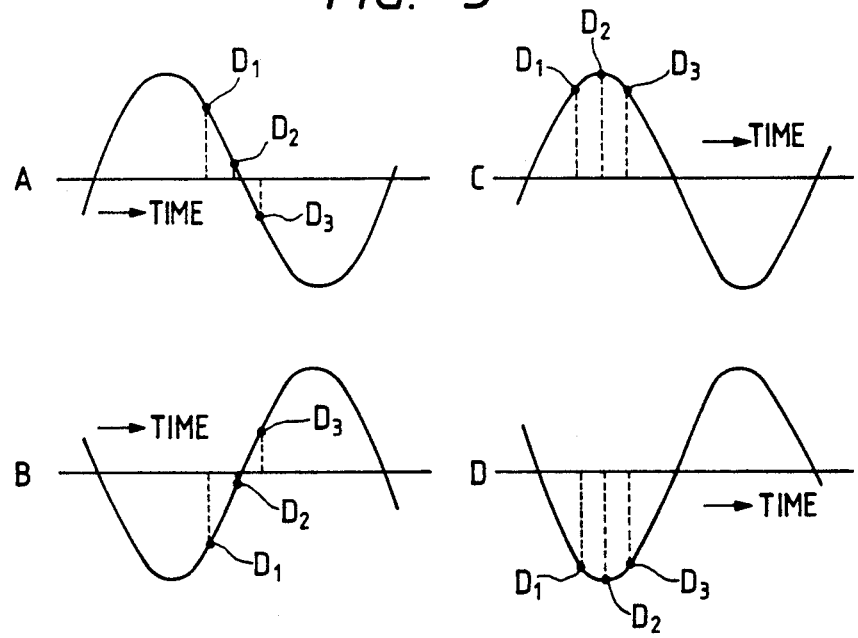

As can be seen from FIG. 5, reading of the data in steps 124, 126 and 128 is executed within a half cycle of the modulated data signal $f_{ID}$ at the time points $D_1$, $D_2$ and $D_3$. From the data read at these three points, it is possible to discriminate the direction of change of the sinusoidal signal within the respective periods and to determine whether the signal is in its positive or negative half cycle. Thus, it is possible to discriminate the phase of the detected part of the modulated data signal $f_{ID}$.

Moreover, as can be seen from FIG. 4 at C and F, reading of the modulated data signal $f_{ID}$ can be effected without fail within an H period of the color difference signal B-Y. Further, reading of the modulated data signal $f_{ID}$ is not carried out immediately after a bit state change of the code, as can be seen in FIG. 4 at F.

In the 4 H mode described above, the timer is operated every 4 H starting with the 30th or 31st H, as shown in FIG. 4 at D and F. Data is read at each of the time points $D_1$, $D_2$ and $D_3$, and the reading operation is completed at the rise of the 252nd pulse of the horizontal synchronizing signal H-SYNC.

Next, referring to the flowchart of FIG. 6 and the timing chart of FIG. 7, the case of the 2 H mode of the data signal will be described. In the 2 H mode, one bit is recorded in 4 H, except in the user area.

Figure 6:
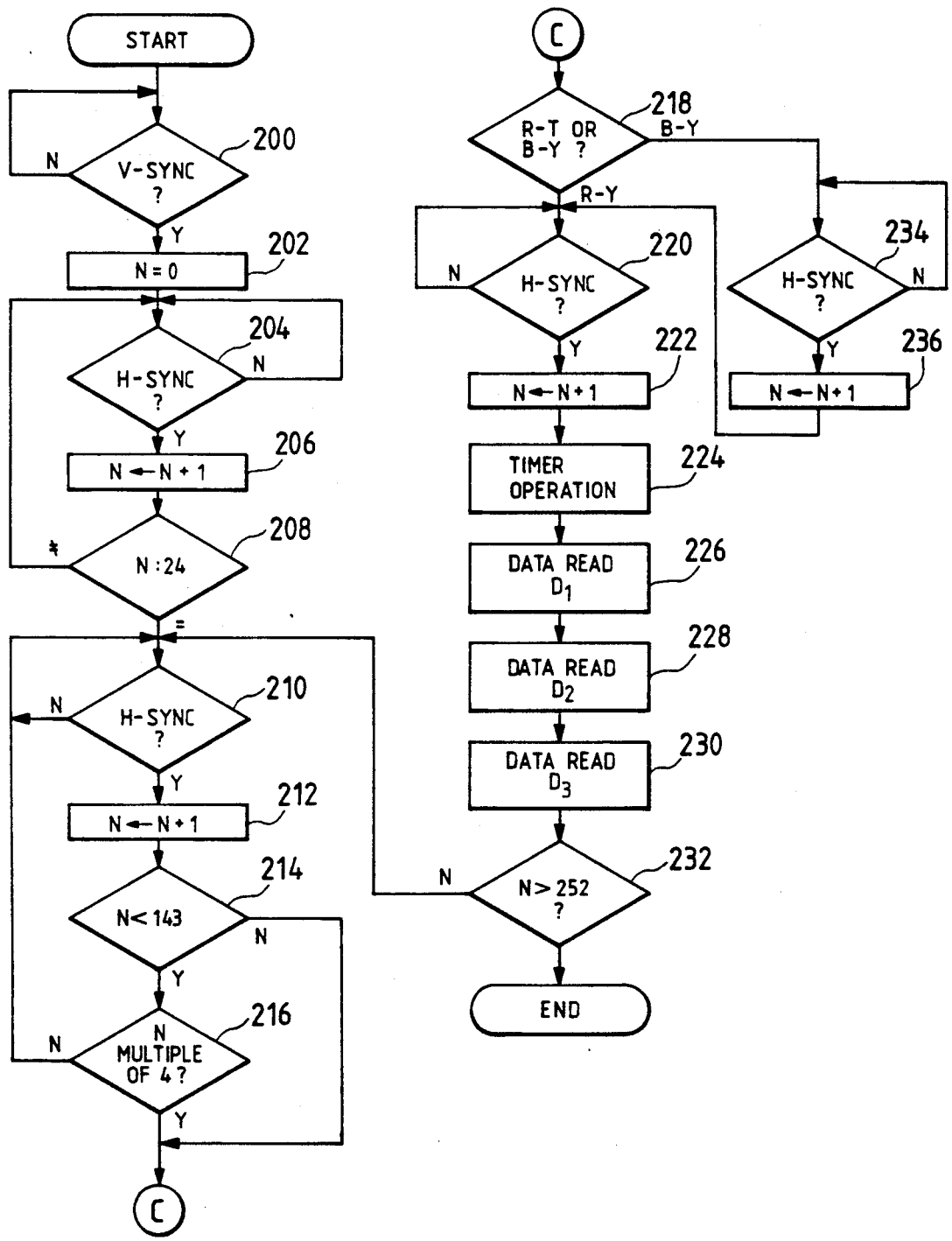
FIG. 6 is a flowchart illustrating the operation of the demodulating device in the 2H mode.
Figure 7:
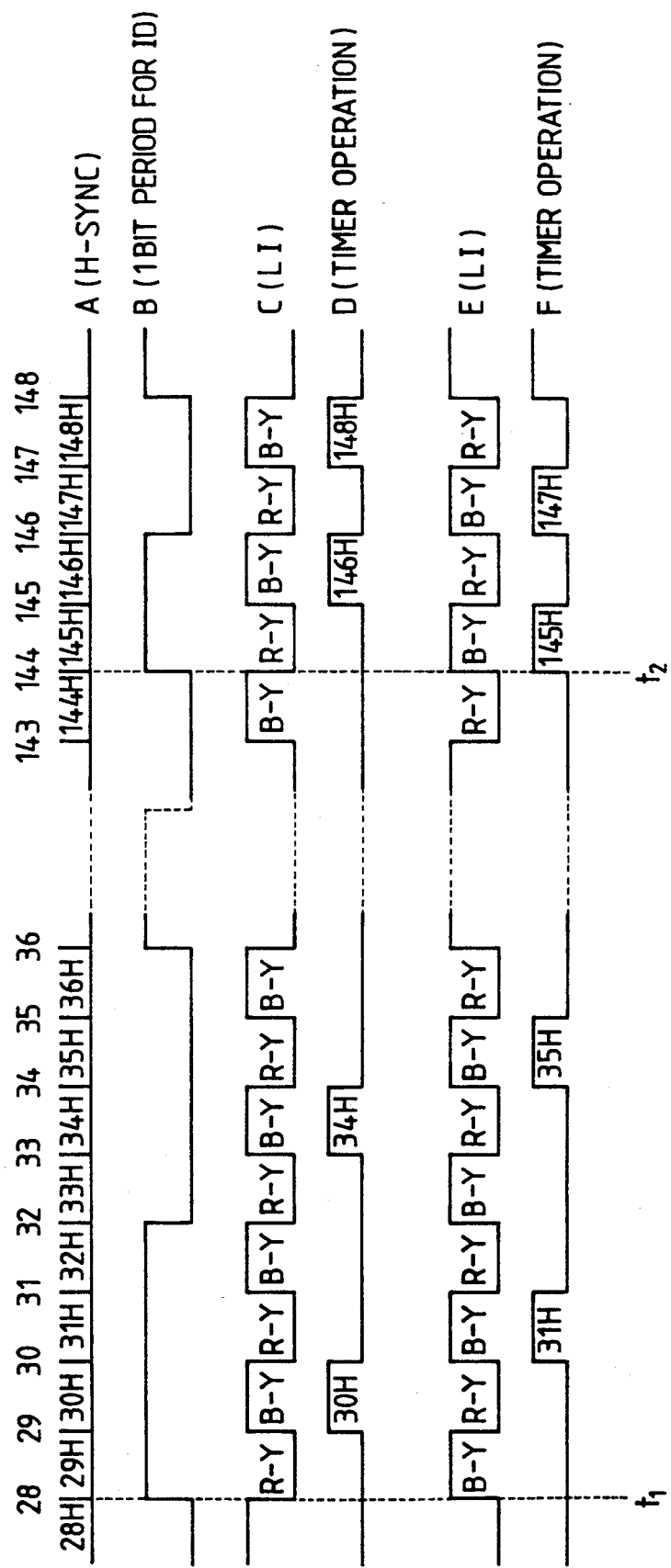
FIGS. 7A–7F are timing charts corresponding to the flowchart of FIG. 6.

The flowchart of FIG. 6 is similar to the flowchart of FIG. 3, except that step 214 is inserted after step 212 (corresponding to step 112 in FIG. 3). Thus, the operation in the 2 H mode is the same as that in the 4 H mode until the rise of the 143rd pulse of the horizontal synchronizing signal is encountered in step 214.

The process proceeds to step 218 when the color difference signal R-Y is detected in the 144th H period. The rise of the horizontal synchronizing signal H-SYNC is then awaited in step 220. When the rise is detected in step 222, the timer is activated in step 224, whereupon data is read at time points $D_1$, $D_2$ and $D_3$ in steps 226, 228 and 230, respectively. The process returns to step 210 when the count N is equal to or smaller than 252. Therefore, in this case, that is, the case where $N > 143$ and there is obtained an R-Y in the 144th H period, the timer is triggered in the (143+2n)-th period of the horizontal synchronizing signal H-SYNC, causing the timer to effect its counting operation every (143+2n)-th H.

When a B-Y color difference signal is obtained in the 144th H period in step 218, the process waits for the horizontal synchronizing signal H-SYNC to rise, and when a rise is detected in step 234, the counter is incremented. The process then goes to step 236, where a similar operation to the above is repeated.

Accordingly, in this case, that is, where $N > 143$ and a B-Y color difference signal is detected in the 144th H period, the timer is triggered in the (143+2n)-th periods of the horizontal synchronizing signal H-SYNC, and the timer carries out its timing operation during every (143+2n+1)-th H period.

When the counter reaches a count of 252 in step 232, the data reading operation is complete.

It is to be noted that the data reading operations carried out at the time points $D_1$, $D_2$ and $D_3$ in steps 226, 228 and 230 are effected at times which are sufficiently late in the timer operation period (1H) that accuracy is ensured.

According to the present invention, a determination is made as to which color difference signal is presently being reproduced, the timer is actuated only during the B-Y periods, and the data of the modulated data signal $f_{ID}$ is read at specified time points. As a result, since the time points are chosen such that the is no effect to the color difference signal R-Y, there occurs no inaccuracy in the phase determination. That is, the modulated data signal $f_{ID}$ can be precisely demodulated.

Figure 8:
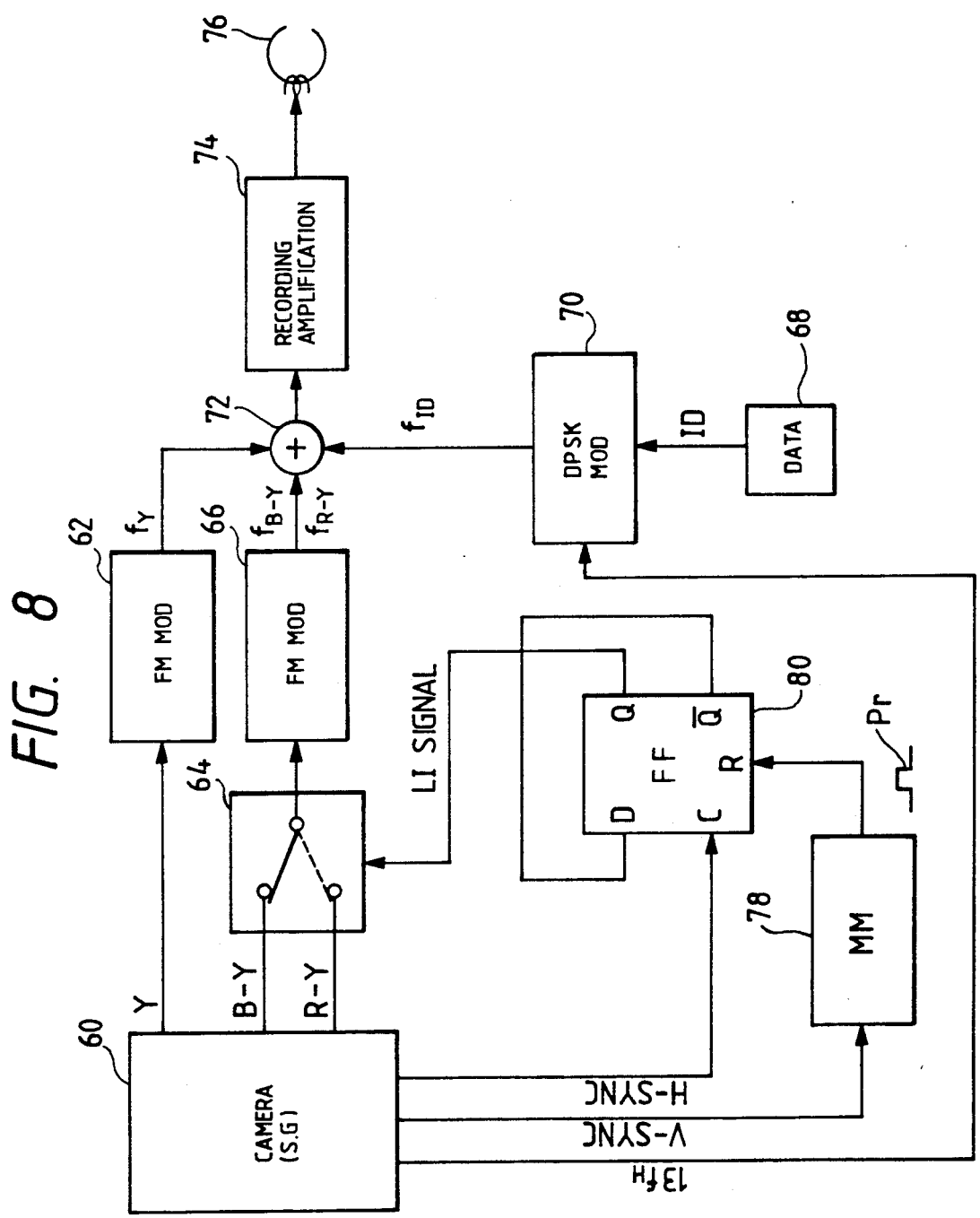
FIG. 8 is a block diagram of a recording device constructed in accordance with another embodiment of the invention.
Figure 9:
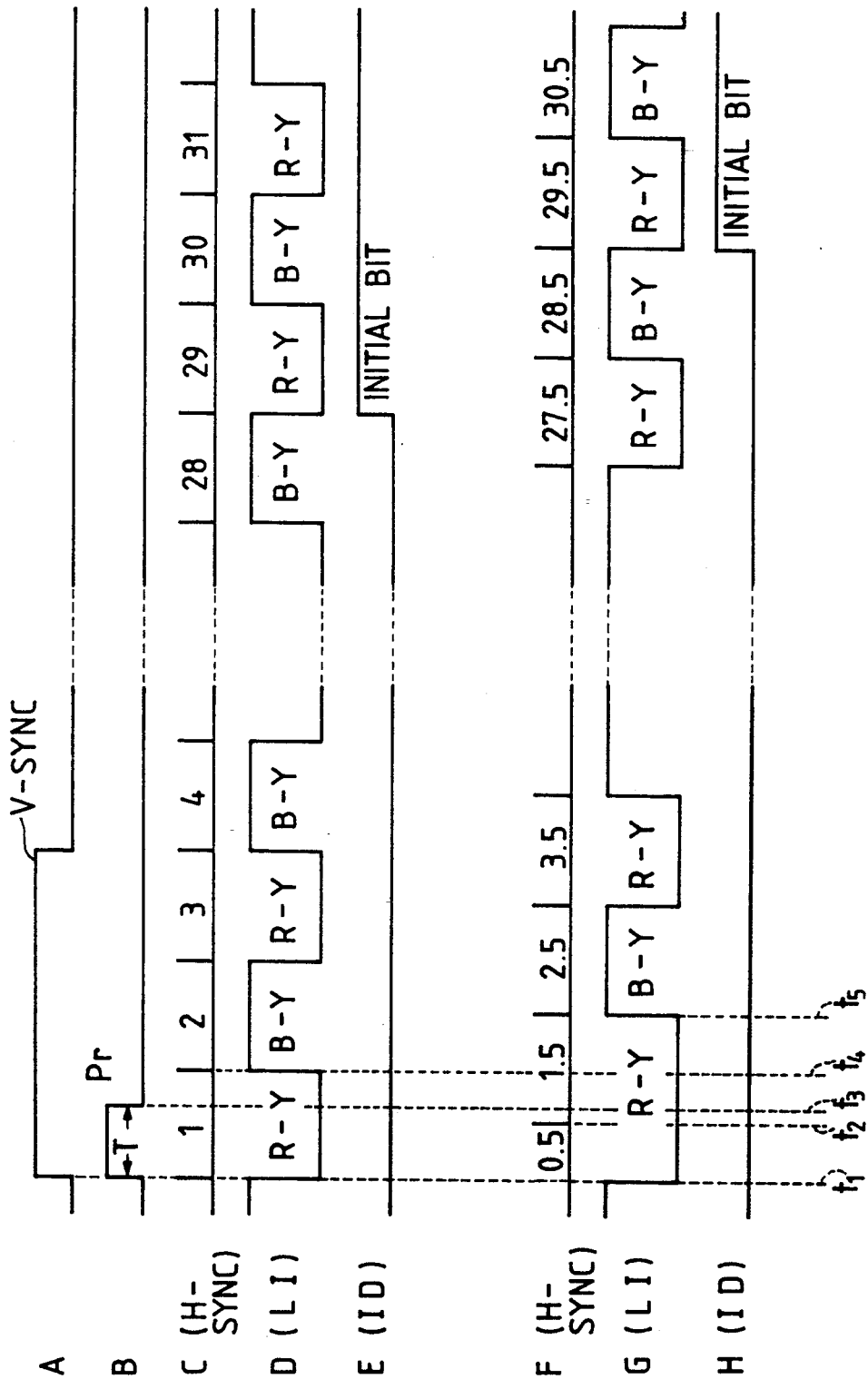
FIG. 9, consisting of A–H, is a timing chart illustrating the operation of the recording device of FIG. 8.

Referring now to FIGS. 8 and 9 of the attached drawings, a still video recorder constructed in accordance with another aspect of the invention will be described.

In FIG. 8, reference numeral 66 is a frequency modulator circuit which frequency modulates the color difference signals B-Y and R-Y for recording. Reference numeral 68 indicates an input source for the data signal ID, and 70 is a DPSK modulator circuit which DPSK-modulates a carrier signal with the data signal from the data signal input source 68. Further, a mixing circuit 72 mixes a modulated luminance signal $f_y$, the modulated color difference signals $f_{B-Y}$ and $f_{R-Y}$, and the modulated data signal $f_{ID}$.

Reference numeral 74 identifies a recording amplifier and 76 a magnetic recording head. Reference numeral 78 indicates a control circuit including a monostable multivibrator which outputs a reset pulse Pr for a period of 0.5 to 1 H when a pulse of the vertical synchronizing signal V-SYNC is received.

Reference numeral 80 depicts a driving circuit composed of a flip-flop which is triggered by the horizontal synchronizing signal applied to its clock terminal and is reset by the reset pulse Pr applied to its reset terminal.

The Q output of the flip-flop 80 is applied to the switching circuit 64, which is thereby switched every 1 H period. When the flip-flop 80 is switched in the first horizontal synchronizing signal period following the reset pulse Pr, the switching state of the switching circuit 64 is controlled so as to supply a color difference signal B-Y to the frequency modulator circuit 66 in the next subsequent horizontal synchronizing signal period.

FIG. 9 is a timing chart illustrating the operation of the recording device for a still video camera of the invention. In FIG. 9, waveform A shows the vertical synchronizing signal V-SYNC, B, the reset pulse Pr, C and F, the horizontal synchronizing signal H-SYNC, D and G, switching (LI) signals, and E and H, the rise of an initial bit of the data signal ID.

The operation of this embodiment of the invention will now be described in detail.

The flip-flop 80 is triggered by the input of a pulse of the horizontal synchronizing signal H-SYNC. Thus, a switching signal LI is produced (FIG. 9 at D) which alternates between "1" and "0" every 1 H period. The switching circuit is set by the LI signal to the state shown by the solid line, that is, the state corresponding to the B-Y color difference signal, when the Q output of the flip-flop 80 is a "1", and to the state shown by the broken line corresponding to the R-Y color difference signal when the Q output is a "0".

When the vertical synchronizing signal V-SYNC rises at a time $t_1$ in FIG. 9, the multivibrator 78 is triggered, thereby producing a reset pulse Pr, as seen in waveform B in FIG. 9. When the reset pulse Pr is applied to the flip-flop 80, the latter is reset at the leading edge of the pulse Pr (a rising edge in this example), whereupon the Q output is set to "0", and hence the switching circuit 64 is set in the state shown by the broken line. At the trailing edge of the pulse Pr at time $t_3$, the reset state is released.

In the even-numbered field periods of the image signal, as shown by waveforms B and C, the reset pulse Pr falls at time $t_3$ within the first H period of the horizontal synchronizing signal, the flip-flop 80 is triggered at time $t_4$, and the Q output then goes to the "1" state. Therefore, the color difference signal B-Y is switched through in the second 1 H period and the color difference signal R-Y is switched through in the third 1 H period. Thereafter, the color difference signals B-Y and R-Y are switched through in successive respective even-numbered and odd-numbered 1 H periods to thereby form the line sequential signal LI, which is recorded.

In the period of the odd-numbered fields of the image signal, the first pulse of the horizontal synchronizing signal occurs at a time $t_2$ which is 0.5 H later than the rise of the vertical synchronizing signal V-SYNC. However, the reset pulse Pr falls at a time a period greater than 0.5 H from the rise of the vertical synchronizing signal V-SYNC so that the flip-flop 80 remains in the reset state until the time $t_3$.

Accordingly, after the reset operation effected by the pulse Pr, the pulse of the horizontal synchronizing signal H-SYNC at the time $t_5$ becomes the first horizontal synchronizing signal pulse. When triggered by this pulse, the Q output of the flip-flop 80 goes to "1", thereby setting the switching circuit 64 in the state indicated by the solid line and thus switching through the color difference signal B-Y in the 1 H period occurring 2.5 H from the rise of the vertical synchronizing signal V-SYNC. As a result, there is obtained an LI signal as shown in FIG. 9 at G wherein the R-Y and B-Y color difference signals are shifted in time by 0.5 H from the rising transitions of the horizontal synchronizing signal H-SYNC in the even numbered fields shown at C in FIG. 9.

In the color video recorder constructed in accordance with this embodiment of the invention, there is provided a control circuit which is triggered by the vertical synchronizing signal V-SYNC and which outputs a reset pulse Pr in an H period of 0.5 to 1 H, and a driving circuit which drives the switching circuit for selecting between R-Y and B-Y for recording every pulse of the horizontal synchronizing signal H-SYNC, which is reset by the pulse Pr, and which controls the switching device so as to obtain the color difference signal B-Y in the horizontal period that follows the first horizontal synchronizing signal pulse following reset. Since the modulated color difference signal $f_{R-Y}$ is recorded in the odd-numbered H periods, in demodulating the modulated data signal $f_{ID}$ by direct A/D conversion, it is possible to carry out demodulation during times when the phase of the modulated data signal $f_{ID}$ is stable, that is, during the periods in which the color difference signal $f_{B-Y}$ is recorded. Further, there is no interference at all by the modulated color difference signal $f_{R-Y}$, whose instantaneous frequency can partially overlap the frequency range of the modulated data signal $f_{ID}$. Hence, there is obtained an excellent effect in that it is possible to obtain exact demodulation of the data signal.

As used above and in the appended claims, the "even numbered" field periods are those fields in which the first horizontal line begins immediately after the leading edge of the vertical synchronizing signal V-SYNC, and the "odd numbered" field periods are those fields in which the first horizontal line begins substantially 0.5 H after the leading edge of the vertical synchronizing signal V-SYNC.

What is claimed is:

1. In still video recorder or the like, a device for reproducing signals from a recording medium on which there is recorded a modulated code signal $f_{ID}$, obtained by modulating a data signal ID in accordance with a DPSK modulation mode, and modulated color difference signals $f_{B-Y}$ and $f_{R-Y}$, obtained by frequency modulating respective color difference signals B-Y and R-Y, are recorded in the same track on said recording medium by multiplex recording, a demodulating device for the data signal comprising:

line discriminating means for discriminating horizontal period in a reproduced signal $f_{ID}$ read from said recording medium in which respective color difference signals B-Y and R-Y are being reproduced;

timer means operating during periods of said color difference signal B-Y as indicated by said line discriminating means for indicating predetermined time points on said reproduced signal during said color difference signal B-Y; and means for reading data from said reproduced signal $f_{ID}$ at said predetermined times indicated by said timer means.

2. The demodulating device of claim 1, further comprising means for determining a phase of said reproduced signal in response to said data read from said reproduced signal.

3. The demodulating device of claim 1, further comprising a counter for counting horizontal synchronizing periods with respect to a preceding vertical synchronizing signal for triggering said timer at predetermined horizontal synchronizing periods within said horizontal synchronizing signal.

4. The demodulating device of claim 3, wherein, for a 4 H mode portion of said horizontal synchronizing signal, said timer is triggered by said counter at $(24+4n+1)$-th horizontal synchronizing signal periods as counted from a preceding vertical synchronizing signal, and said timer carries out a count operation during $(24+4n+2)$-th horizontal synchronizing periods, where n is a positive integer.

5. The demodulating device of claim 3, wherein, for a 2 H mode portion of said horizontal synchronizing signal, said timer is triggered by said counter at $(143+2n)$-th horizontal synchronizing signal periods as counted from a preceding vertical synchronizing signal, and said timer carries out a count operation during $(143+2n+1)$-th horizontal synchronizing periods, where n is a positive integer.

6. The demodulating device of claim 1, wherein said predetermined time points are three in number and are within a single half cycle of said reproduced signal.

7. In a still video camera or the like, a recording device comprising:

switching means for switching between color difference signals B-Y and R-Y to form a line sequential signal for alternate 1 H periods of a horizontal synchronizing signal;

means for recording said line sequential signal in multiplex form together with a data signal ID on the same track on a recording medium;

control means for producing a reset pulse Pr for a period of 0.5 to 1 H in response to triggering by a pulse of a vertical synchronizing signal V-SYNC; and means for driving said switching means, said driving means being toggled between first and second states for every pulse of said horizontal synchronizing signal H-SYNC and being reset to said second state by said reset pulse Pr, said driving means in said first state setting said switching means to switch through said color difference signal B-Y in a first horizontal synchronizing period following said reset pulse Pr.

8. The recording device of claim 7, wherein said control means comprises a monostable multivibrator triggered by a leading edge of said vertical synchronizing signal V-SYNC, said monostable multivibrator having an output pulse period of greater than 0.5 H.

9. The recording device of claim 8, wherein said driving means comprises a flip-flop connected in a toggle mode, said flip-flop having said horizontal synchronizing signal H-SYNC applied to a clock input terminal thereof and a output of said monostable multivibrator applied to a reset input thereof.

10. In a still video recorder or the like, a device for reproducing signals from a recording medium on which there is recorded a DPSK-modulated code signal $F_{ID}$ and frequency-modulated color difference signals $F_{B-Y}$ and $F_{R-Y}$ are recorded by multiplex recording, a demodulating device for a data signal comprising:
discriminating means for discriminating a period during which a signal B-Y is being reproduced from said recording medium; and
means for demodulating said signal $f_{ID}$ during said period discriminated by said discriminating means.

11. A recording device in a still video camera comprising:
means for recording to a recording medium, together with an ID data subjected to a DPSK modulation, a signal $f_{R-Y}$ which is obtained by subjecting a color difference signal R-Y to frequency modulation, during every other 1H period with the first period of recording of said signal $f_{R-Y}$ during recording of even-numbered fields beginning substantially from a leading edge of a vertical synchronizing signal; and
means for recording to said recording medium, together with the DPSK modulated ID data, a signal $F_{R-Y}$ which is obtained by subjecting a color difference signal R-Y to frequency modulation during every other 1 H period, with the first period of recording of said signal $f_{R-Y}$ during recording of odd-numbered fields beginning substantially 0.5 H period from the leading edge of the vertical synchronizing signal.

12. In a still video camera or the like, a recording device comprising:
switching means for switching between colored difference signals B-Y and R-Y, in response to a switching control signal having first and second states to form a line sequential signal for alternate 1 H periods of a horizontal synchronizing signal;
means for recording said line sequential signal in multiplex form together with a data signal ID on the same track on a recording medium; and
switching control signal generating means for generating said switching control signal with a first phase during recording of even-numbered fields and with a second phase during recording of odd-numbered fields.

13. The recording device of claim 12, wherein, for recording of even-numbered fields, transitions between said first and second states of said switching control signal occur substantially at integer multiples of a 1 H period from a vertical synchronizing signal, and for recording of odd-numbered fields the transitions between said first and second states occur substantially at odd integer multiples of a 0.5 H period from said vertical synchronizing signal.

14. The recording device of claim 13, wherein said switching means passes said signal B-Y in response to a first state of said switching control signal, and the first transition from said second state to said first state occurs more than a 1 H period after the leading edge of said vertical synchronizing signal.

15. In a device for reproducing signals from a recording medium on which there is recorded a modulated data signal $f_{ID}$ and modulated first and second color signals, a demodulating device for the data signal comprising:
line discriminating means for discriminating horizontal periods in a reproduced signal $f_{ID}$ read from said recording medium;
timer means operating during periods of said first color signal for indicating predetermined time points on said reproduced signal during said first color signal; and
means for reading data from said reproduced signal $f_{ID}$ at said predetermined times indicated by said timer means.

16. A recording device comprising:
switching means for switching between first and second color signals during alternate horizontal intervals in response to a switching control signal having first and second states to form a line sequential signal having vertical intervals each including a plurality of horizontal intervals;
means for recording said line sequential signal together with a data signal ID on a recording medium;
control means for producing a reset pulse PR at least once during each vertical interval; and
means for driving said switching means, said driving means being toggled between first and second states for every horizontal interval and being reset to said second state by said reset pulse Pr, said driving means in said first state setting said switching means to switch through one of said first and second color signals in a first horizontal interval following said reset pulse Pr.

* * * * *